United States Patent
Ramakrishnan

(10) Patent No.: US 7,529,276 B1
(45) Date of Patent: May 5, 2009

(54) COMBINED JITTER AND MULTIPLEXING SYSTEMS AND METHODS

(75) Inventor: Sangeeta Ramakrishnan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1159 days.

(21) Appl. No.: 10/235,371

(22) Filed: Sep. 3, 2002

(51) Int. Cl.
    *H04L 12/28* (2006.01)
(52) U.S. Cl. .................. 370/516; 370/412; 370/468; 370/537
(58) Field of Classification Search ................. 370/412, 370/468, 516, 537
    See application file for complete search history.

(56) References Cited

U.S. PATENT DOCUMENTS

| | | | |
|---|---|---|---|
| 5,606,369 A | 2/1997 | Keesman et al. | |
| 5,640,388 A * | 6/1997 | Woodhead et al. | 370/468 |
| 5,710,784 A | 1/1998 | Kindred et al. | |
| 5,719,872 A | 2/1998 | Dubberly et al. | 370/487 |
| 5,861,919 A | 1/1999 | Perkins et al. | |
| 5,862,140 A | 1/1999 | Shen et al. | |
| 5,898,833 A | 4/1999 | Kidder | |
| 6,038,256 A | 3/2000 | Linzer et al. | |
| 6,094,457 A | 7/2000 | Linzer et al. | |
| 6,181,711 B1 * | 1/2001 | Zhang et al. | 370/468 |
| 6,192,083 B1 | 2/2001 | Linzer et al. | |
| 6,195,388 B1 | 2/2001 | Choi et al. | |
| 6,201,798 B1 | 3/2001 | Campanella et al. | 370/326 |
| 6,205,151 B1 | 3/2001 | Quay et al. | |
| 6,226,328 B1 | 5/2001 | Assuncao | |
| 6,230,203 B1 * | 5/2001 | Koperda et al. | 709/229 |
| 6,259,733 B1 | 7/2001 | Kaye et al. | |
| 6,269,078 B1 * | 7/2001 | Lakshman et al. | 370/230 |
| 6,339,450 B1 | 1/2002 | Chang et al. | |
| 6,418,122 B1 | 7/2002 | Schoenblum et al. | |
| 6,434,197 B1 | 8/2002 | Wang et al. | |
| 6,466,623 B1 | 10/2002 | Youn et al. | |

(Continued)

OTHER PUBLICATIONS

International Organisation for Standardisation Organisation Internationale De Normalisation, "Generic Coding of Moving Pictures and Associated Audio: Systems", ISO/IEC JTC1/SC29/WG11/N0801, Nov. 13, 1994.

(Continued)

*Primary Examiner*—Ricky Ngo
*Assistant Examiner*—Chandrahas Patel
(74) *Attorney, Agent, or Firm*—Weaver Austin Villeneuve Sampson LLP

(57) ABSTRACT

Described herein are systems and methods for processing and transmitting data included in packets with jitter. The systems and methods combine a jitter buffer and a buffer scanned by a look ahead window as a combined buffer. The combined buffer varies look ahead window and performance of a process that uses the look ahead window based on the current jitter support in the buffer. More specifically, the flexible buffering techniques flexibly adapt the size of the look ahead window based on the amount of buffer space used for jitter support. When jitter support requirements are low, the size of the look ahead window is increased. When the look ahead window is implemented with a multiplexer, the multiplexer may benefit from a larger look ahead window and improve multiplexer performance. Improved multiplexer performance may lead to less or more intelligent re-encoding and bit rate reduction for video data transmission applications, leading to improved decoded output video quality.

21 Claims, 6 Drawing Sheets

U.S. PATENT DOCUMENTS

| | | | |
|---|---|---|---|
| 6,577,682 B1 | 6/2003 | Brightwell et al. | |
| 6,594,271 B1 | 7/2003 | Wu et al. | |
| 6,625,228 B1 * | 9/2003 | Nervo et al. | 375/295 |
| 6,674,796 B1 | 1/2004 | Haskell et al. | |
| 6,795,506 B1 | 9/2004 | Zhang et al. | |
| 6,847,656 B1 | 1/2005 | Wu et al. | |
| 6,859,460 B1 * | 2/2005 | Chen | 370/412 |
| 6,904,059 B1 * | 6/2005 | Newson et al. | 370/516 |
| 6,959,020 B1 * | 10/2005 | Hourunranta et al. | 370/542 |
| 6,977,948 B1 * | 12/2005 | Chennubhotla et al. | 370/516 |
| 7,006,511 B2 * | 2/2006 | Lanzafame et al. | 370/412 |
| 7,016,337 B1 | 3/2006 | Wu et al. | |
| 7,142,566 B1 * | 11/2006 | Leyn et al. | 370/509 |
| 7,159,233 B2 * | 1/2007 | Son et al. | 725/86 |
| 7,173,947 B1 | 2/2007 | Ramakrishnan et al. | 370/537 |
| 7,187,697 B1 * | 3/2007 | Aviely et al. | 370/517 |
| 7,292,602 B1 | 11/2007 | Liu et al. | |
| 2001/0038668 A1 | 11/2001 | Gatepin | |
| 2002/0110193 A1 | 8/2002 | Yoo et al. | |
| 2002/0131496 A1 | 9/2002 | Vasudevan et al. | |
| 2002/0136298 A1 | 9/2002 | Anantharamu et al. | |
| 2003/0043908 A1 | 3/2003 | Gheng | |

OTHER PUBLICATIONS

Huifang Sun, "Architectures for MPEG Compressed Bitstream Scaling", IEEE Transactions on Circuits and Systems for Video Technology, vol. 6, No. 2, Apr. 1996, pp. 191-199.

Wei Ding, "Joint Encoder and Channel Rate Control of VBR Video over ATM Networks", IEE Transactions on Circuits and Systems for Video Technology, vol. 7, No. 2, Apr. 1997, pp. 266-278.

ISO/IEP Information Technology-Generic Coding Of Moving Pictures And Associated Audio Information: Video, ISO/IEC 13818-2, 1995, 209 pages.

USPTO Non-Final Office Action mailed May 28, 2008 in related U.S. Appl. No. 11/074,554, 14 pages.

Office Action dated May 1, 2003 in related U.S. Appl. No. 09/514,577. (CISCP176).

Final Office Action dated Apr. 6, 2004 in related U.S. Appl. No. 09/514,577. (CISCP176).

Office Action dated Oct. 22, 2003 in related U.S. Appl. No. 09/514,577. (CISCP176).

Notice of Allowance dated Dec. 7, 2004 in related U.S. Appl. No. 09/514,577. (CISCP176).

Supplemental Notice of Allowance dated Jan. 9, 2006 in related U.S. Appl. No. 09/514,577. (CISCP176).

Office Action dated Dec. 13, 2005 in related U.S. Appl. No. 10/034,057. (CISCP276).

Office Action dated May 26, 2006 in related U.S. Appl. No. 10/034,057. (CISCP276).

Office Action dated Nov. 13, 2006 in related U.S. Appl. No. 10/034,057. (CISCP276).

Final Office Action dated Apr. 20, 2007 in related U.S. Appl. No. 10/034,057. (CISCP276).

Notice of Allowance Dated Jul. 6, 2007 in related U.S. Appl. No. 10/034,057. (CISCP276).

* cited by examiner

COMBINED JITTER AND MULTIPLEXING SYSTEMS AND METHODS

BACKGROUND OF THE INVENTION

The present invention relates generally to systems and methods for transmitting data. More specifically, the present invention relates to improved jitter processing and multiplexing of video data.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. Many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent video, audio and/or data. Since transmission of video data with existing communication channels is often excessive, compression is an approach used to make digital video images more transportable. Digital video compression allows digitized video data to be represented in a much more efficient manner and makes it possible to transmit the compressed video data using a channel at a fraction of the bandwidth required to transmit the uncompressed video data. Compression represents significant data savings, which results in much more efficient use of channel bandwidth and storage media.

To further reduce the transmission load, bitstreams are frequently combined for transmission within a channel. A multiplex is a scheme used to combine bitstream representations of multiple signals, such as audio, video, or data, into a single bitstream representation. A multiplexer then refers to an apparatus or software that multiplexes multiple bitstreams using a suitable multiplex scheme. A re-multiplex is one class of multiplexing and refers to a scheme used to combine bitstream representations of multiple multiplexed signals, such as multiple video signals, into a single bitstream representation. A re-multiplexer then re-multiplexes data from multiple multiplexed bitstreams into a single bitstream.

Multiplexing schemes usually vary the bandwidth allocated to each incoming bitstream, or its associated channel, based on the output channel bandwidth and current bitstream demands. One problem with delivering real-time compressed video bitstreams over a given bandwidth channel is matching the available bandwidth to the compressed bit rate of the data being transmitted. If the channel bandwidth is not enough, rate reduction is used to decrease the bandwidth required to send the compressed video data. The rate reduction may include re-quantization with a larger quantization step value or complete re-encoding, for example. After suitable rate reduction, the multiplexer or re-multiplexer then schedules the packets for transmission. Rate reduction often diminishes end-user video quality. Since rate reduction often leads to picture quality degradation, it should be minimized. However, many conventional transmission systems produce excessive rate reduction, leading to diminished output video quality.

Based on the foregoing, improved methods and systems for transmitting video data that reduce the amount of rate reduction would be desirable.

SUMMARY OF THE INVENTION

The present invention provides improved systems and methods for processing and transmitting data included in packets with jitter. In one aspect of the present invention, a jitter buffer and buffer scanned by a look ahead window are implemented as a combined buffer. When the next processing stage after jitter buffering implements a look ahead window, such as multiplexing, statistical rate re-multiplexing or any other processing that uses a look ahead approach to improve performance, the present invention permits flexible buffering techniques to improve look ahead performance and jitter support. In this case, the combined buffer varies look ahead window and multiplexer performance based on the current jitter of the data arriving in the buffer. More specifically, the flexible buffering techniques flexibly adapt the size of the look ahead window based on the amount of jitter present. When jitter is are low, the size of the look ahead window is increased. Since most multiplexers that implement a look ahead window benefit from a larger look ahead window, and the average network jitter in the packets is typically far less than the maximum network jitter designed into a jitter buffer, a combined buffer as described herein allows a larger look ahead window and improved multiplexer performance. As mentioned previously, improved multiplexer performance may lead to less re-encoding or more intelligent re-encoding and bit rate reduction for video data transmission applications, leading to improved decoded output video quality.

In one aspect, the present invention relates to a network device for transmitting compressed video data onto a channel. The network device comprises an input network interface designed or configured to receive multiple bitstreams. At least one of the multiple bitstreams has packets that include jitter and transport compressed video data. The network device also comprises a buffer that stores the packets received by the input network interface and removes jitter from the packets. The network device further comprises a multiplexer designed or configured to schedule packets from the multiple bitstreams and scan packets in the buffer to adjust allocation of bandwidth on the channel based on the buffer scan. The network device additionally comprises an output network interface in digital communication with the multiplexer and designed or configured to output the packets from the bitstreams onto the channel.

In another aspect, the present invention relates to a method for transmitting compressed video data onto a channel. The method comprises receiving multiple bitstreams. At least one bitstream includes compressed video data contained in packets that have jitter. The method also comprises storing the packets in a buffer in a manner that reduces the jitter. The method further comprises scanning the buffer using a look ahead window, wherein the size of the look ahead window varies with the amount of jitter. The method additionally comprises scheduling the packets from the multiple bitstreams. The method also comprises transmitting data packets from each of the multiple bitstreams onto the channel.

In yet another aspect, the present invention relates to a network device for transmitting compressed video data onto a channel. The network device comprises means for receiving multiple bitstreams. At least one bitstream includes compressed video data contained in packets that have jitter. The network device also comprises means for storing the packets in a buffer in a manner that reduces the jitter. The network device further comprises means for scanning the buffer using a look ahead window, wherein the size of the look ahead window varies with the amount of jitter. The network device additionally comprises means for scheduling the packets from the multiple bitstreams. The network device also comprises means for transmitting data packets from each of the multiple bitstreams onto the channel.

In still another aspect, the present invention relates to computer readable medium including instructions for processing compressed video. The instructions comprise instructions for receiving multiple bitstreams, at least one bitstream of the multiple bitstreams including compressed video data contained in packets that have jitter. The instructions also comprise instructions for storing the packets in a buffer in a manner that reduces the jitter. The instructions further comprise instructions for scanning the buffer using a look ahead window, wherein the size of the look ahead window varies with the amount of jitter. The instructions additionally comprise instructions for scheduling the packets from the multiple bitstreams. The instructions also comprise instructions for transmitting data packets from each of the multiple bitstreams onto the channel.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
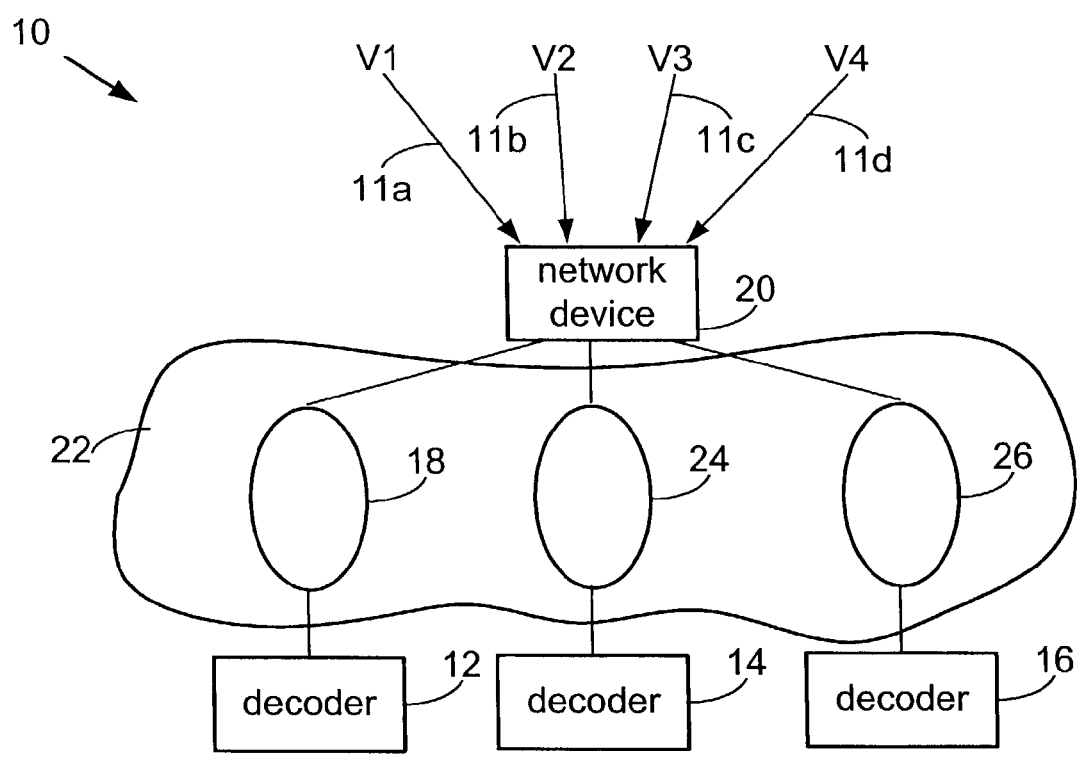
FIG. 1 illustrates an exemplary network system for transmitting compressed video data in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

In one embodiment, systems and methods of the present invention include a multiplexer or re-multiplexer that uses a look ahead window to determine future demands of the various bitstreams being multiplexed. The look ahead window allows the multiplexer or re-multiplexer to make better decisions regarding allocating bandwidth for different bitstream or channels and for determining when and if re-encoding, or transcoding, is necessary. When the look ahead window size increases, the multiplexer usually improves its performance—resulting in reduced re-encoding and less video quality degradation. Conventionally, look ahead window sizes are limited in size to avoid extra processing delays and excessive memory requirements.

As packets in a data transmission traverse a network path from transmitter to receiver, the spacing between packets may be altered. Unintended or transmission induced delays between the spacing of packets is commonly referred to as jitter. As the term is used herein, jitter refers to disturbances or abnormalities in the time continuous delivery of time-referenced packets and data. Jitter may be thought of as a property of a bitstream and/or the packets transporting data in the bitstream. A more precise definition of jitter is provided by the International Telecommunication Union (ITU): jitter—short-term variations of the significant instants of a digital signal from their ideal positions in time. When a real-time application, such as video on demand or digital television, or the network devices responsible for the data transmission, receives packets with altered spacing between the packets or packets out of the initial transmission order, buffering is commonly used to allow delayed data and packets to arrive, be stored, and be re-inserted into the transmission at their intended delivery time.

According to one embodiment of the present invention, when packets to be processed by a multiplexer include jitter, a combined buffer is used to remove the jitter before processing by the multiplexer. If the packets are received from an Internet protocol (IP) transmission for example, significant network jitter is usually present in the packets. Conventionally, a dedicated jitter buffer is used at the receiving input to remove the network jitter. The output of this dedicated jitter buffer is then fed to the next stage of processing, with the jitter having been removed. The jitter buffer introduces a delay equal to the maximum jitter supported by such a buffer. However, it has been found that the average network jitter in packets resulting from transmission in a network is typically far less than the maximum network jitter designed into such a buffer. A jitter buffer that supports jitter larger than the average jitter in the network is traditionally used to reduce the probability of packet loss. In the case of real-time compressed video transmission, packet loss leads to missed frames and significant video quality degradation.

The present invention however improves data and packet transmission techniques by combining look ahead window buffering schemes and de-jitter buffering. Thus, if the next stage of processing after jitter buffering happens to be multiplexing, such as statistical rate re-multiplexing or any other processing that uses a look ahead approach to improve performance, the present invention then applies flexible buffering techniques to improve look ahead performance and jitter removal.

Thus, in one aspect of the present invention, a jitter buffer and look ahead window buffer are implemented as a combined buffer. The combined buffer varies look ahead window and multiplexer performance based on the current jitter present in the data. More specifically, the flexible buffering techniques described herein flexibly adapt the size of a look ahead window based on the amount of jitter present. The smaller the jitter, the more the data present in the buffer. When jitter is low, the size of the look ahead window may be increased, to take advantage of the larger amount data available in the buffer. Since most statistical re-multiplexers benefit from a larger look ahead window, and the average network jitter in the packets is typically far less than the maximum network jitter designed into such a buffer, the flexible buffering techniques described herein lead to a continual larger look ahead window and improved multiplexer performance. As mentioned previously, improved re-multiplexing performance may lead to less re-encoding and bit rate reduction.

Video data transmission according to the present invention may thus reduce video quality degradation resulting from bit rate reduction, and thereby improve video data delivery and output video quality.

Referring now to FIG. 1, an exemplary system 10 where flexible buffering techniques in accordance with the present invention are particularly useful will be described. System 10 is responsible for transmitting compressed video data from multiple bitstreams 11a-d to target decoders 12, 14 and 16. Bitstreams 11a-d include compressed video data corresponding to video programs V1, V2, V3, and V4.

Network device 20 selectively transmits compressed video data from programs V1, V2, V3, and V4. For each compressed bitstream output request, the network device 20 may multiplex and/or re-multiplex compressed video data from bitstreams 11a-d. In some cases, network device 20 also converts the bit rate of video data to help the output multiplexed bitstream fit within the allowable channel bandwidth between the network device 20 and one of target decoders 12, 14 and 16.

In one embodiment, network device 20 employs statistical re-multiplexing techniques. Statistical re-multiplexing, also called statistical rate re-multiplexing, is a process which performs statistical multiplexing of bitstreams already in a compressed format. Thus, statistical re-multiplexing includes accepting multiple variable bit rate bitstreams, some of which may be received in a multiplex, and outputting a single constant bit rate bitstream that fits within a channel. Statistical re-multiplexers of the present invention use a look ahead window to determine future demands of the various bitstreams being re-multiplexed. In applications such as video on demand, digital cable headend systems, and digital advertisement insertion systems, statistical re-multiplexing may improve the overall system efficiency, resulting in better bandwidth usage and reduced transmission cost. Although the present invention will now primarily be discussed with respect to multiplexing and statistical re-multiplexing, systems and methods of the present invention are well suited for any multiplexing, re-multiplexing or statistical re-multiplexing scheme, as one of skill in the art will appreciate. For example, network device 20 may be used to multiplex one or more bitstreams not having been previously multiplexed. As the term is used herein, multiplexing is meant to be a comprehensive term that encompasses multiplexing schemes, re-multiplexing schemes, statistical re-multiplexing schemes, or combinations thereof.

In some cases, such as within a telco environment, network device 20 is aware of the video content requests of a target decoder that it transmits to and the available bandwidth therebetween. Alternatively, e.g., in some cable environments, network device 20 broadcasts multiple multiplexed video programs without specific requests from end user receivers. In some cable distribution networks, compressed signals and programs are transmitted via network device 20 through local networks and then to the decoders. Network device 20 and the local networks together form a distribution network for the compressed signals. In one exemplary cable distribution network, network device 20 is a so-called "super head-end" facility that feeds multiple multiplexed video programs to smaller regional head-ends within local networks via fiber optical networks (such as SONET or DWDM based networks). Each regional head-end in turn is connected to its own population of target decoders, e.g., multiple decoders like 12 are usually connected to a single regional head-end. In a typical telco scenario for example, the regional head-ends are telco central offices each connecting to a large number decoder/receivers via twisted phone wires (DSL).

In another application of this invention, network device 20 is a single channel transrater that performs rate reduction on a single incoming bitstream to make it match the outgoing channel bandwidth. This is particularly useful in DSL applications. Look ahead also has benefits even in a single channel application. By looking ahead at the characteristics of the bitstream, one can allocate bits (bandwidth) intelligently to different video data, e.s. pictures.

The present invention may also be used in a device that performs format transcoding e.g., converting from one format/standard to another such as MPEG-2 HDTV stream to an MPEG-2 SDTV stream. Or conversion between MPEG-2 and MPEG-4. Any of these would benefit from look ahead to help do improved rate allocation amongst pictures.

In other cable distribution environments, the network device 20 selects video programs not based on individual end receiver request, but on a specific programming mix that the local cable operator plans to carry over their local cable distribution. By way of example, a local cable operator in San Jose, Calif. may carry services such as Discovery, CNN, HBO and ABC, and thus it receives and selects such programs via network device 20 and broadcasts them over their local cable distribution plant. Alternatively, a local operator in San Francisco may carry services such as CNN, CBS and ABC, and will provide programs accordingly. In this case, end-receivers and decoders do not participate in the selection process. In contrast, in the case of video on demand, end receivers have control on the selection of programming, which typically originates from a video server and connected by the network device via local or wide area networks.

Target decoder 12 receives compressed video data from network device 20 through a local network 18. Local network 18 is included in a larger network 22 that also includes local networks 24 and 26, which service the target decoders 14 and 16, respectively. In one embodiment, network device 20 is a headend and local network 18 corresponds to a geographic service area of a cable network serviced by the headed. Decoder 12 may then correspond to a decoder included in a set-top box or personal computer located in a residential home. Decoder 12 decompresses the compressed video data into an uncompressed format for visual output to the user.

When digital video is compressed, the encoder assumes a particular bit rate profile, whether it is constant bit rate (CBR) or a variable bit rate (VBR). The word "profile" refers to the fact that transport bit rate may not be constant, but variable under certain constraints, such as peak bit rate, average bit rate, minimum bit rate, etc. The VBR representation of compressed video data allows a video encoder to generate compressed bitstreams that, when decoded, produce consistent video quality. However, as a result of the compression process, the number of bits required to represent the compressed data differs widely from picture to picture. The specific VBR characteristics of the compressed bitstream depends on the complexity of the video image, amount of motion in the video sequence, as well as changes made in post-generation such as scene cuts, fades, wipes, picture-in-picture, etc. Since each of the bitstreams 11a-d may have a dynamically varying variable bit rate (VBR), network device 20 allocates output channel bandwidth to minimize video underflow in downstream decoder buffers 12, 14, and 16, despite the variable bit rate.

Figure 2:
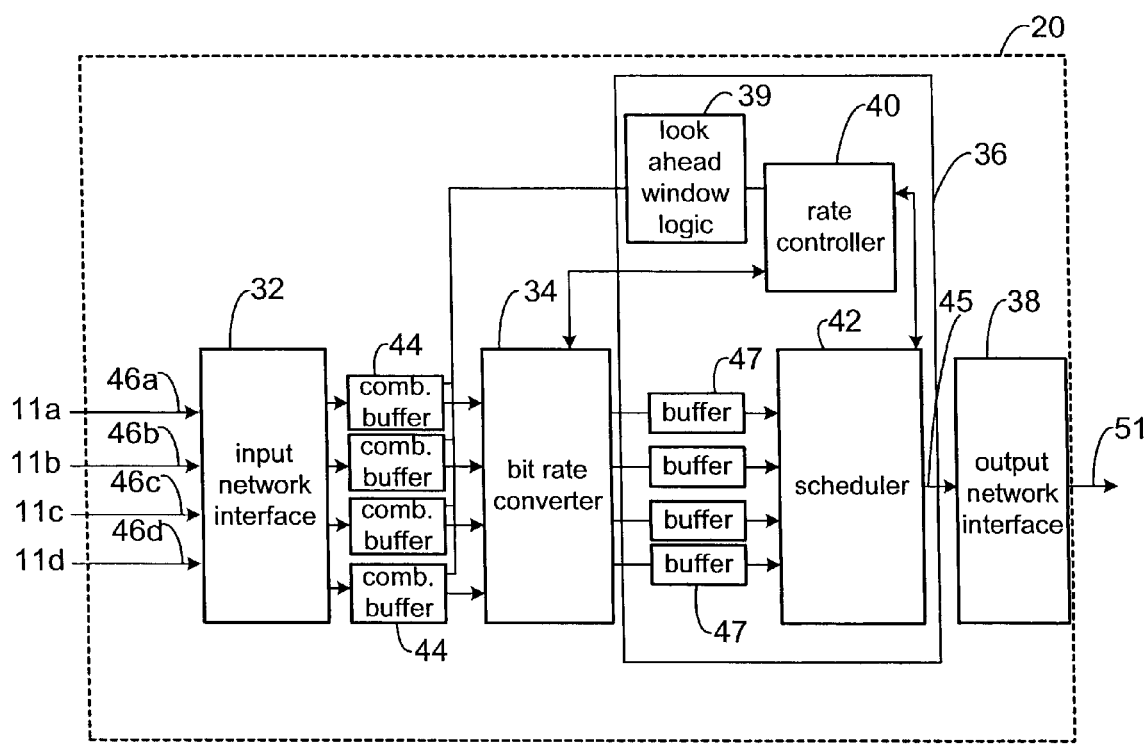
FIG. 2 is a block diagram of the network device included in the system of FIG. 1 in accordance with one embodiment of the present invention.

FIG. 2 illustrates a block diagram of network device 20 of FIG. 1, which provides multiplexed bitstreams including compressed video data transported in packets, in accordance with one embodiment of the present invention. While the present invention will now be described as an apparatus composed of units, those skilled in the area will recognize that the present invention encompasses a method, process or software having as elements the actions performed by each unit and described below.

Network device 20 comprises: an input network interface 32, buffers 44, bit rate converter apparatus 34, multiplexer 36, look ahead window logic 39, and output network interface 38. Multiplexer 36 comprises rate controller 40 and scheduler 42. As one of skill in the art will appreciate, each of the structures of network device 20 may be a single hardware and/or software structure, multiple hardware and/or software structures, or combined in a more simple apparatus scheme.

Input network interface 32 has a plurality of input lines 46a-d that receive bitstreams 11a-d from a variety of transmission sources, and includes suitable receiving components to receive the bitstreams from each source. For example, input line 46a is coupled to a satellite receiver that receives compressed video data from a satellite based communication system. Input line 46b receives compressed video data from an Internet network including a series of ATM based routers which route the compressed video data to network device 20. Input line 46c is coupled to a receiver that receives compressed video data from a terrestrial source and network interface 32 may also include a suitable frequency demodulation and descrambling facilities. The line 46d receives compressed video data from an Internet network using IP This invention is not limited to networks using IP protocol, and may be implemented with ATM, frame relay, etc., protocol that routes a compressed bitstream from a video streaming server to the network device 20. While network device 20 shows only four incoming bitstreams and channels being serviced, one of skill in the art will recognize that any number of bitstreams and channels may be serviced by input network interface 32. At least one of the channels introduces jitter in the packets of a bitstream 11, e.g., during transmission. Input network interface 32 includes a number of output lines that provide compressed video data to buffers 44. Network device 20 may also include additional facilities, disposed between input network interface 32 and buffers 44, to parse any timing, programming, video data, and other auxiliary information, as appropriate.

Buffers 44 are memory components and each include an inlet in digital communication with an outlet of network interface 32, and include an outlet that leads to downstream processing. As shown, the outlet of each buffer 44 leads to an inlet of bit rate converter apparatus 34. In another embodiment, the outlet of each buffer 44 leads to an inlet of multiplexer 36. Buffers 44 store compressed video data and packets received by input network interface 32 for each of the input bitstreams until bit rate converter apparatus 34 or scheduler 42 processes the compressed video data for transmission.

Temporary storage of packets and data in buffers 44 allows jitter between the packets to be resolved. Thus, the output of each buffer 44 is regular, or dejittered—as much as packet reception and buffer 44 size allows. Buffers 44 store packets in a manner that reduces jitter, which often corresponds to a given amount of time to provide jitter support. In some cases, transmission may be so poor that resolution of packets received out of order is accomplished. In extreme cases, packets are not received by network device 20, either because the buffer delay has been exceeded or the packets have been lost in transmission. In this case, not all the originally encoded or transmitted data is provided from the outlets of buffers 44. The packets and data output by buffers 44 is provided to the next stage of processing with any jitter having been removed—according to the receiving limits of network device 20 and time delay of buffer 44. For some video on demand applications, it may be desirable to store the data in the buffer from about 50 milliseconds to about 500 milliseconds to allow for suitable jitter support.

As shown, network device 20 includes a buffer 44 for each channel serviced by input network interface 32, e.g., for each input line 46 included in input network interface 32. In another embodiment, network device includes a generalized buffer 44 that services more than one channel serviced by input network interface 32 or more than one input line 46. While network device 20 shows only four incoming bitstreams and channels leading to buffers 44, one of skill in the art will recognize that any number of buffers 44 may be implemented in network device 20.

Buffers 44 allow multiplexer 36 to scan the buffers to facilitate multiplexing and determine future demands of the various bitstreams being multiplexed. In one embodiment, multiplexer 36 scans the buffers 44 with a look ahead window that allows the multiplexer 36 to make better decisions regarding allocating bandwidth for bitstreams 11a-d and for determining when and if re-encoding, or transcoding, is necessary. As will be described in further detail with respect to FIGS. 3A-3D, buffers 44 permit variable-sized look ahead window usage based on the amount of data packets present in a buffer. In one embodiment, the total size of buffers 44 is proportional to the maximum jitter supported by network device 20 and a predetermined size of the look ahead window based on a desired multiplexer performance. In another embodiment, the total size of buffer 44 is proportional to the maximum jitter supported by network device 20 and the bit rate of the incoming bitstreams.

Coupled to an output of each buffer 44 is bit rate converter apparatus 34. When necessary, bit rate converter apparatus 34 transcodes video data in one or more of the incoming bitstreams. Broadly speaking, transcoding refers to altering data or information in a bitstream. Transcoding encompasses transrating (changes in bit rate) and changes in format such as changing data from HDTV to SDTV or MPEG2- to MPEG 4. Thus, this invention also is well suited for use with many forms of transcoding. When desirable, the network device 20 reduces the bit rate of the compressed video data transmitted in the output multiplex 45 based on the channel capacity of the channel between the network device 20 and the target decoder. Bit rate conversion of a bitstream refers to the process performed on compressed video data that results in a different transmission bit rate than the originally compressed video data was encoded with. In a typical scenario, the new bit rate for the output multiplexed bitstream 34 is smaller than the original bit rates of the input bitstreams, but sometimes the resulting bit rate can also be greater than the original bit rates. The bit rate conversion may occur on any one or more of the bitstreams received by the network device 20. For example, bit rate converter apparatus 34 may adapt the bit rate of video data from bitstream 11a before transmitting it in a multiplex.

In some scenarios, output multiplexed bitstream 45 is delivered to different transmission channels each having a different channel capacity—and the bit rate for each channel may be tailored accordingly. By way of example, two bitstreams 11a and 11c received at 4 Mbps and 2 Mbps (total input=6 Mbps) may be combined and bit rate converted by bit rate converter apparatus 34 to a multiplexed transmission bitstream of 3.5 Mbps for a channel capable of delivering only 3.5 Mbps. The same bitstreams may also be combined and bit rate converted by the bit rate converter apparatus 34 to a compressed transmission bitstream of 5 Mbps for a channel capable of delivering only 5 Mbps. In this case, the data and bit rate conversion process is intended to remove bits from the modified compressed bitstreams so that the new bitstreams are still compliant to the given compression syntax, and can be decoded by a receiver, albeit at a possibly lower quality than the originally compressed bitstream. Bit rate conversion of a compressed bitstream is further described in commonly owned U.S. Pat. No. 6,181,711, which is incorporated by reference herein for all purposes. The output of bit rate converter apparatus 34 is provided onto output lines to multiplexer 36.

Multiplexer 36 comprises scheduler 42 and multiplexer buffers 47, which receive compressed video data from bitstreams 11a-d, either as received by network device 20 or as transcoded by bit rate converter apparatus 34. Buffers 47 store the compressed video data until processing by scheduler 42. Scheduler 42 determines the relative order of data transmission from buffers 47.

Multiplexer 36 uses a look ahead window to determine future demands of the various bitstreams being multiplexed. The 'look ahead window' refers to the process of scanning and/or analyzing data and packets in the bitstreams 11 to determine the bit usage and complexity characteristics of the bitstreams 11 for a length of time, X, ahead of data and packets currently being sent. X refers to the changing size of the look ahead window, which varies at a given time based on the size of buffer 44 and the amount of present in the bitstream currently being provided by the buffer (FIGS. 3A-3D). The maximum size of the look ahead window is the size of buffer, which corresponds to zero jitter present in the bitstream. In the specific embodiment shown, network device includes look ahead window logic 39 that implements a look ahead window to parse data in the buffers 44 to determine the bit usage and characteristics of each bitstream for some amount of time corresponding to the size of the look ahead window, ahead in time of what multiplexer 36 is currently multiplexing and transmitting out from output network interface 51. As described in greater detail with respect to FIGS. 3A-3D, the size of the look ahead window varies with the amount of jitter present in the bitstream 46. Look ahead window logic 39 is coupled to each buffer 44 and to rate controller 40. Look ahead window logic 39 scans the compressed video data contained in the bitstream packets and extracts and/or determines information useful to rate controller 40 or bit rate converter apparatus 34. The information may include: the number of bits used for each coded picture in the bitstream, picture coding type, average quantization step size used in compressing the data, fade or scene cut information, etc. This information is particularly useful for allocating outgoing bandwidth for each of the bitstreams 11 by rate controller 40. Use of a look ahead window allows the multiplexer 36 to make better decisions regarding allocating bandwidth for different bitstreams or channels, and for determining if transcoding is necessary. Typically, when the look ahead window size increases, the multiplexer may improve its performance, resulting in reduced or better re-encoding and video quality degradation.

Multiplexer 36 also includes rate controller 40, which is in digital communication with bit rate converter apparatus 34, scheduler 42, and look ahead window logic 39. Having scanned the bitstreams 11 for a given time period ahead of current multiplex processing (the time determine by the current size of the look ahead window), multiplexer 36 uses the information to determine how much to rate reduce the video data from each input bitstream 11a-d, and how to allocate the output channel bandwidth among bitstreams 11.

More specifically, based on messages received from rate controller 40, bit rate converter apparatus 34 adjusts the bit rate of compressed video data from each input bitstream. Rate controller 40 may rely on information regarding the channel that the output re-multiplexed bitstream 45 is to be transmitted onto. For example, rate controller 40 may be configured to receive a rate value from an RADSL transmitter in an ADSL embodiment or to receive a rate value from an ATM network in an ATM environment. A control signal is provided by the rate controller 40 to bit rate converter apparatus 34. The control signal specifies the amount of modifying the bit rate converter apparatus 34 performs to achieve the desired output bit rate from network device 20.

Scheduler 42 comprises inputs coupled to each buffer 47 outlet, an input line from rate controller 40, and an output line coupled to network interface 38. Scheduler 42 selectively combines packets including compressed video data to form multiplexed bitstream 45. In some cases, scheduler 42 outputs packets such that downstream decoder buffer levels avoid underflow. To this end, scheduler 42 may selectively send packets from each buffer 44 based on the downstream decoder buffer levels. Thus, if a downstream decoder buffer (such as decoder 12 of FIG. 1) has excessive buffer levels while a second downstream decoder buffer (such as decoder 14 of FIG. 1) has low buffer levels, scheduler 42 may increase transmission of data to the second downstream decoder from its corresponding buffer, as appropriate. Scheduler 42 may also insert any headers, stuffing bits, filler packets when desirable. Scheduler 42 outputs a multiplexed bitstream 45 including compressed video data from bitstreams 11a-d. In one embodiment, multiplexed bitstream 45 has a substantially constant bit rate.

In one embodiment, multiplexer 36 is a statistical multiplexer. A statistical multiplexer is a multiplexer that takes advantages of the statistical behavior of video data to minimize the total bandwidth usage of video data from multiple bitstreams. More specifically, the statistical multiplexer takes advantage of the variable bit rate (VBR) nature of multiple bitstreams comprising compressed video data. In one embodiment, when scheduler 42 combines multiple bitstreams, the bit rate of each incoming VBR bitstream may be adjusted but the total bit rate of the output multiplexed compressed bitstream 45 is kept at a substantially constant value. When a statistical multiplexer combines multiple bitstreams, an algorithm may be used to adapt the bit rate of each VBR video signal but the total bit rate of the output multiplex is kept at a constant value. In a specific embodiment, network device corresponds to a RateMux C6900, or a media linecard product, as implemented in a router as described in further detail with respect to FIG. 5.

When there is sufficient bandwidth on the outgoing channel to transmit all the outgoing multiplexed video data, scheduler 42 simply schedules all the packets to send out—without transcoding. In one embodiment, scheduling and statistical multiplexing includes one or more of the following procedures:

analysis of video content using a variable sized look ahead window to determine the optimal bit budget allocation for each input bitstream and possible impact on underlying video quality at different bit budget allocations.

coded picture decisions such as whether to use motion compensation.

picture coding for each input bitstream that meets the bit usage budget determined by the previous procedure, also called rate control as described above with respect to the bit rate converter 34.

monitoring and compensation of timing information on all bitstreams, e.g., in order to carry real-time compressed bitstreams.

coordinated selection of bit rates across all input bitstreams and buffers 44 to result in a total fixed rate.

scheduling and multiplexing of different bitstreams from buffers 44 into a fixed bandwidth channel.

The output of scheduler 42 and multiplexer 36 is multiplexed bitstream 45, which is provided to output network interface 38. Output network interface 38 is configured to transmit the multiplexed bitstream 45 including the scheduled compressed video data onto a suitable channel. Output network interface 38 has a plurality of output lines that transmit bitstreams to a variety of sources using suitable transmitting components. For example, output network interface 38 may comprise a transmitter known in the art for DSL networks. Output network interface 38 may also comprise a transmitter known in the art for IP networks, for example. In a specific embodiment, the output medium is an Internet network where network interface 38 transmits through a series of nodes, which route the multiplexed bitstream to a suitable receiver. Network interface 38 may also comprise a transmitter known in the art for ATM networks, for example. In a specific embodiment, the output medium is an Internet network where network interface 38 transmits through a series of ATM based routers which route the MPEG-2 compressed video data to a suitable receiverIn another specific embodiment, the network interface is a ASI interface, which in turn feeds an HFC network. The output of network interface 38 forms the output 51 of network device 20. While the input and output network interfaces 32 and 38 are illustrated in FIG. 2 as separate structures, it is understood that in many network devices, a common network interface may be implemented that includes both receiving and transmitting functionality, and associated facilities, as one of skill in the art will appreciate. For example, the common network interface may include all the receiving and transmitting services as described above with respect to input network interface 32 and output network interface 38.

Improved buffering and look ahead techniques according to the present invention may improve the quality of compressed video signals under the constraint of a fixed total transmission bandwidth, e.g., one imposed by the outgoing channel capacity. The resulting improvement can be described in terms of the so called 'statistical gain', which can be measured either in terms of the improvement of subjective visual quality of the decoded video, or the objective average amount of rate reduction used, etc. Over time, transferring saved bandwidth in this manner may result in improved video quality for the end-user.

FIGS. 3A-3D are illustrative diagrams of a combined buffer 44 of FIG. 2 in accordance with one embodiment of the present invention. Buffer 44 may be thought of as a single buffer that includes the combined capacity for a jitter support and a storage buffer used for look ahead window techniques, such as a variable sized look ahead window.

Figure 3A:
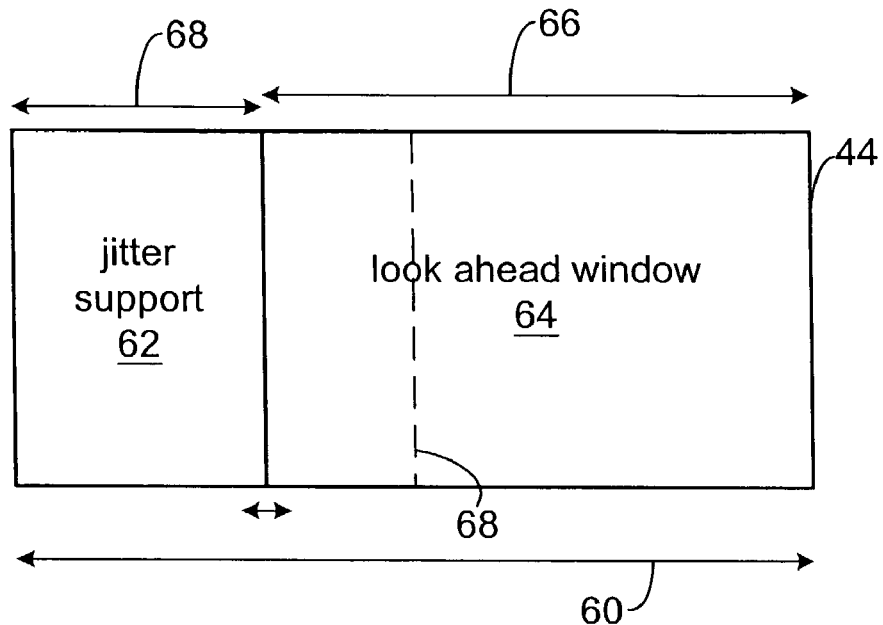
FIGS. 3A-3D are illustrative diagrams of a buffer included in the network device of FIG. 2A in accordance with one embodiment of the present invention.

Referring to FIG. 3A, space within combined buffer 44 is flexibly shared between jitter support 62 and look ahead window 64. Typically, the size 66 of look ahead window 64 varies such that jitter support 62 and look ahead window 64 comprise the total space 60 of buffer 44. The space 68 of jitter support 62 in buffer 44 changes according to the current jitter present in the data and packets being stored. Since jitter support 62 will vary based on the jitter demands of the incoming bitstream into buffer 44, look ahead window 64 varies in size 66 accordingly to the current allowable size of the look ahead window. In one embodiment, the variable look ahead window 64 size 66 is maximized in buffer. More specifically, the variable size of the look ahead window 64 is determined by the size 60 of buffer 44 minus the current jitter support needs for the data and packets stored in buffer 44.

As a result, multiplexer 36 is not guaranteed a constant look ahead time, but its look ahead time at any given instant is inversely proportional to the amount of jitter in buffer 44 at that time. FIGS. 3A-3D show varying space allocations in buffer 44 for jitter support 62 and a look ahead window 64 based on varying jitter support requirements for buffer 44.

In one embodiment, the total size 60 of buffer 44 is approximately equal to the designated maximum jitter 70 (FIG. 3B) supported by network device 20 plus a desired or minimum look ahead window size 72 supported by network device 20. The designated maximum jitter supported by network device 20 refers to a desired or pre-determined jitter support for the network device. Maximum jitter 70 may also vary according to the network device 20 processing speed and amount of jitter on the network(s) serviced by network device 20. The minimum look ahead window size 72 is an implementation determination that provides a minimum, and usually constant, look ahead performance for multiplexer 36 or any other process that uses look ahead window 64. The minimum look ahead window size 72 may be determined according to a number of design criteria such as a desired multiplexer 36 performance, output channel capacity, characteristics of the network device, acceptable system delay, available memory, costs etc. Maximum jitter to be supported will depend on the jitter characteristics of network and the level of acceptable packet loss. Jitter characteristics of the network may be determined empirically by testing the network by sending data, or theoretically by studying the documented jitter characteristics of the various network components. Once the jitter characteristics are determined, one can determine the max jitter supported by taking into account the acceptable probability of packet loss. For example if the acceptable level of packet loss is 1 in $10^5$ packets or 0.01%, the max jitter is set to a level such that probability of jitter larger than that value is less than 0.01%. FIG. 3A illustrates operation of combined buffer 44 when the incoming bitstream provides less jitter than the designated maximum jitter 70 supported by network device 20. In this case, look ahead window 64 is larger than the desired minimum look ahead window size 72. For network device 20, the jitter produced as a result of transmission on a network will most frequently be much lower than the maximum network jitter 70 support by network device 20. This results in a look ahead window 64 that is usually larger than the minimum look ahead window size 72. Since the performance of multiplexer 36 is related to the look ahead time provided by look ahead window 64, multiplexer 36 will benefit from the typically reduced jitter levels (relative to the maximum jitter specification), which allows multiplexer 36 to look further ahead into incoming bitstreams stored in buffers 44.

Figure 3B:
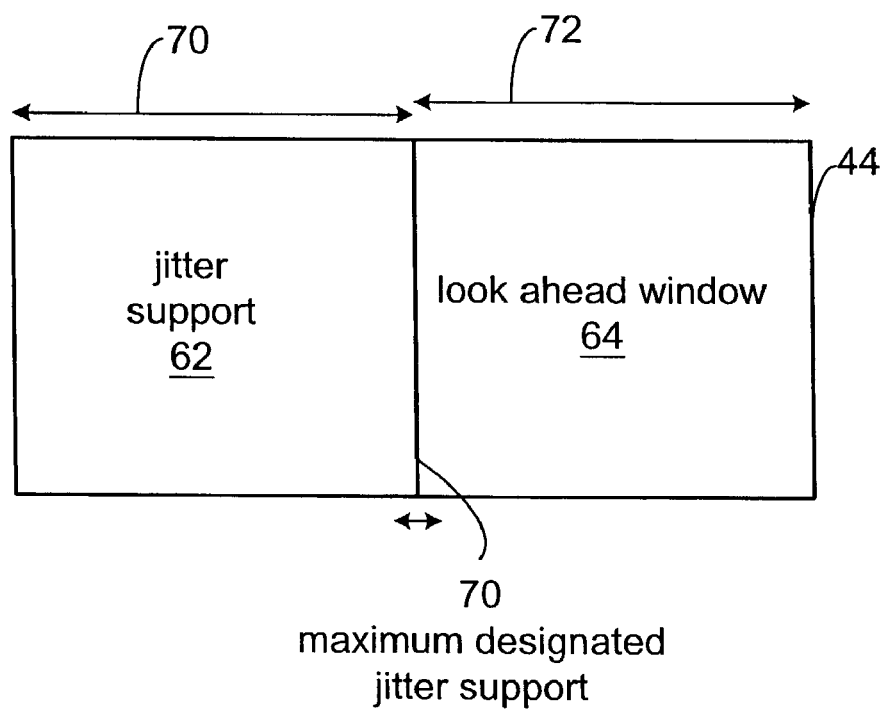
Figure 3C:
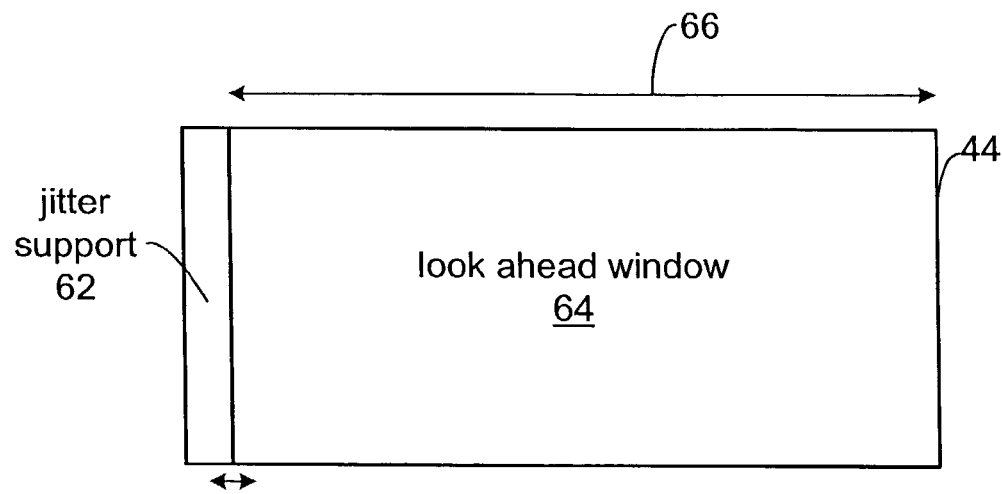

FIG. 3C illustrates operation of combined buffer 44 when the incoming bitstream provides much less jitter than the designated maximum jitter 70 supported by network device 20. In this case, multiplexer 36 benefits even more from a look ahead window size 66 that almost completely spans the size 60 of the combined buffer 44. Statistically for a healthy transmission network, combined buffer 44 would most commonly have a profile somewhere between that shown in FIG. 3A and FIG. 3B. Over extended period of time, an average size 66 of look ahead window 64 would correspond to the designated minimum look ahead time plus the maximum designated jitter support minus the average jitter actually received from the incoming data over the period of time. This implies that with an overall buffer delay and memory requirement being substantially the same as conventional disparate jitter and multiplexer buffers, combined buffer techniques of the present invention improve the average look ahead time. Using the statistical re-multiplexer techniques described above for example, multiplexer 36 is then able to substantially improve downstream output video quality by improving output channel bandwidth usage and minimizing transcoding.

FIG. 3B illustrates operation of combined buffer 44 when the incoming bitstream has jitter according to the maximum jitter 70 supported by network device 20. In this case, which is highly uncommon in normal operation, look ahead window 64 has a size that corresponds to the minimum look ahead buffer size 72 or a conventional dedicated look ahead window having a constant size.

Figure 3D:
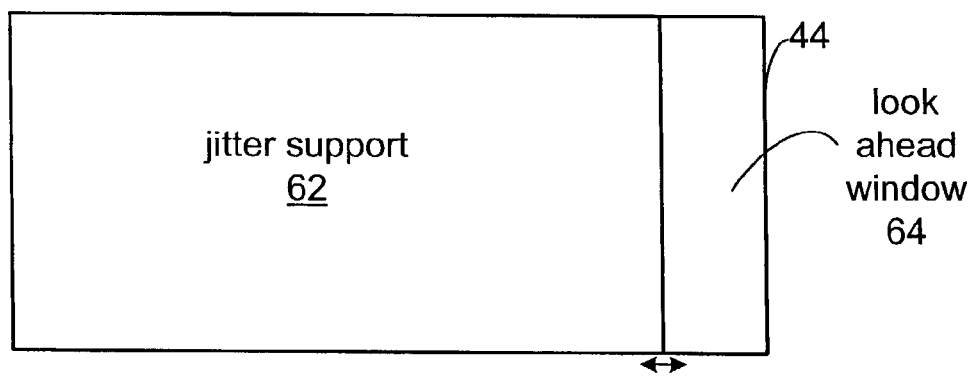

However one advantage of buffer 44 is that jitter support may take a larger portion of combined buffer 44, when needed (FIG. 3D). Thus, in the rare event that the incoming bitstream includes packet delivery that would normally result in packet and data loss according to a conventional fixed size jitter buffer, e.g., a packet came in so late that it exceeded the fixed size jitter support time, combined buffer 44 may expand jitter support to capture packets that might normally be lost. Packets lost during a real-time transmission, e.g. for a video-on-demand application, are irrevocably lost and may lead to skipped frames and other noticeable and nontrivial video degradation effects.

FIG. 3D illustrates operation of combined buffer 44 when the incoming bitstream includes excessive jitter and buffer 44 provide jitter support greater than the designated maximum jitter 70 supported by network device 20. In this case, jitter support 62 comprises the majority of the space in combined buffer 44. While look ahead window 64 now includes a much smaller size that may lead to diminished multiplexer 36 performance, one of skill in the art will appreciate that packet loss—and its resulting skipped frames or other video degradation effects—is a more significant concern for quality video data transmission. Thus, by expanding jitter support 62 size when needed, combined buffer 44 and its flexible jitter support size allows reduced packet loss during times of excessive jitter in data transmission.

While the amount of jitter shown in FIG. 3B or FIG. 3D would not be regularly encountered by a normally functioning network, the distribution of space within buffer 44 between jitter support 62 and look ahead window 64 as shown in FIGS. 3A-3D is helpful for illustrative purposes. As shown, buffer provides improved jitter support, when needed, and improved look ahead window times for the majority of a transmission. However, buffer 44 provides increased performance while the total memory requirement for network device 20 remains substantially the same. Namely, the present invention allows improved processing of data and packets without incurring additional memory costs by replacing what was conventionally two disparate buffers with a single combined buffer that does not impose additional memory costs on network device 20.

Figure 4:
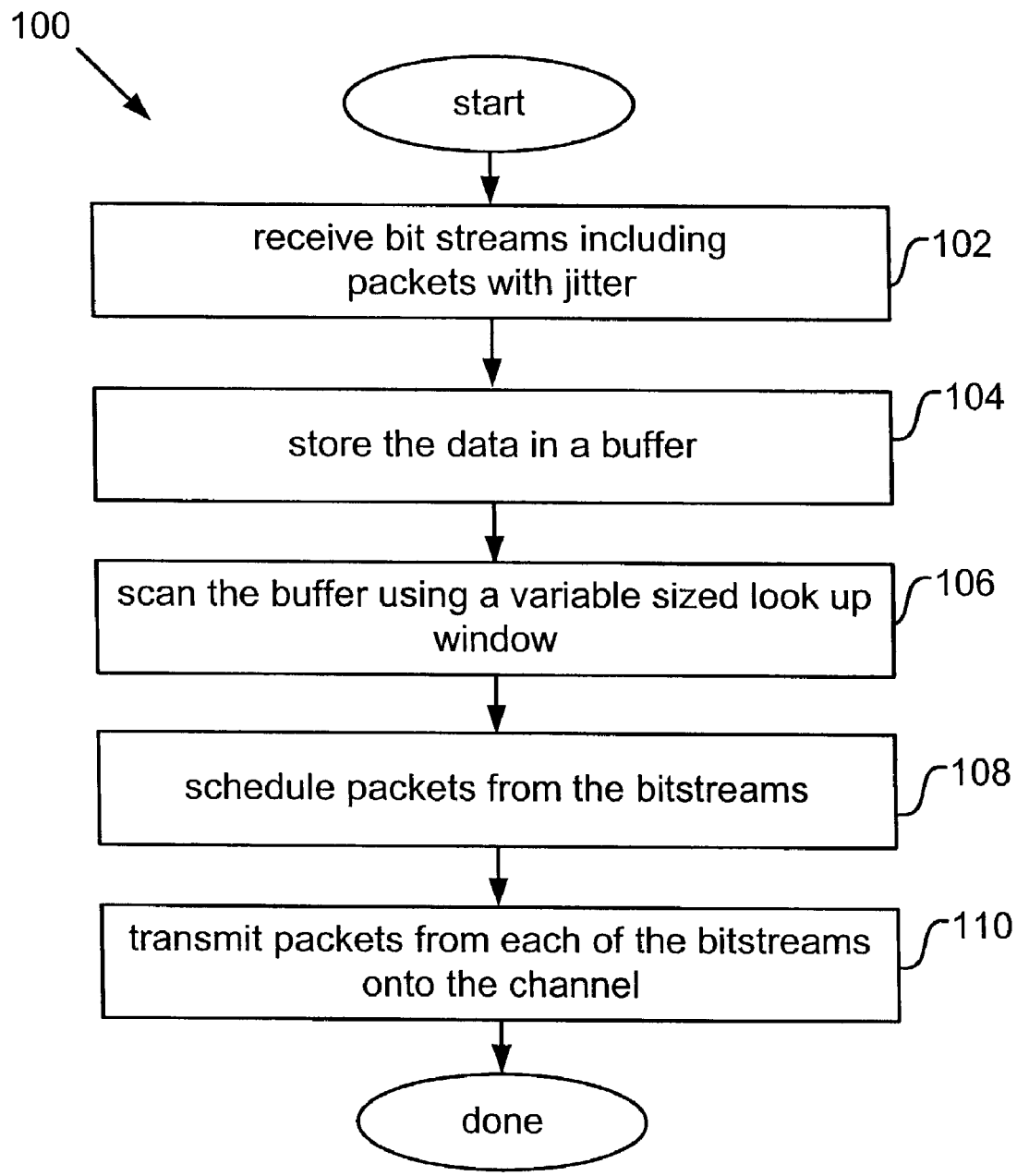
FIG. 4 illustrates a process flow for transmitting compressed video data onto a channel in accordance with one embodiment of the present invention.

The present invention is not strictly limited to improving downstream output video quality, and may be flexibly administered to improve other aspects of video data transmission. For example, if the metric to optimize is system delay and/or memory requirement, combined buffer 44 may be tailored for these purposes also. More specifically, by reducing the minimum look ahead time, the system delays required in processing using buffer 44 and memory requirements for buffer 44 may be reduced. Alternately, techniques of the present invention may be used to trade-off statistical multiplexer performance versus delays resulting from buffer size. [FIG. 4 illustrates a process flow 100 for transmitting compressed video data onto a channel in accordance with one embodiment of the present invention. Process flow 100 may take place in any network device such as the network device 20 of FIG. 2. Processes in accordance with the present invention may include up to several additional steps not described or illustrated here in order not to obscure the present invention. While data transmission will now be described as a method, those skilled in the area will recognize that the present invention encompasses a system or software having units capable of performing the actions as described below.

The process flow 100 begins by receiving multiple bitstreams including packets with jitter and transporting compressed video data (102). The bitstreams are received from one or more sources, such as satellite and Internet sources. Receiving the bitstreams may also include any necessary demodulation, descrambling, and parsing of any timing, programming, video data, and other auxiliary information, as appropriate.

The data and packets are then stored in a buffer (104). Temporary storage of data in the buffers allows jitter in the data to be resolved over time. As described above, the duration of data storage in the buffer may vary. At a minimum, the packets are stored long enough for jitter between the packets to settle. For some video on demand applications, it may be desirable to store the data in the buffer from about 50 milliseconds to about 500 milliseconds to allow for suitable jitter support. In other cases, a jitter support delay from about 100 milliseconds to about 300 milliseconds may provide suitable jitter support. In a specific embodiment, a jitter support delay of 200 milliseconds may be suitable.

Downstream in processing from the buffer is a multiplexer that uses a look ahead window to facilitate scheduling. At some point during storage, the date and packets in the buffer are scanned using a variable sized look ahead window (106) as described with respect to FIGS. 3A-3D, for example. According to buffer 44 described above, the size of the look ahead window varies with the amount of jitter support provided by the buffer. In another embodiment, the size of the look ahead window is established according to a performance criteria of the multiplexer. For some video data transmission applications, the size of the look ahead window may correspond to a processing delay from about 0 to about 2 seconds. In other applications, a look ahead window size that produces a processing delay from about 250 milliseconds to about 500 milliseconds may be suitable. In a specific embodiment, a processing delay of 250 milliseconds may be suitable.

The above ranges for jitter support delay and look ahead window processing delay may be combined to determine processing delays for a combined buffer of the present invention. In one embodiment, a combined buffer 44 is sized to produce a delay in the range of about 50 milliseconds to about 2.5 seconds. In some applications, buffer delays according to buffer 44 usage in the range of about 350 to about 100 milliseconds may be suitable.

If the channel bandwidth is not enough to meet delivery needs for all the incoming video data, rate reduction is used to decrease the bandwidth requirement to meet the available bandwidth. Transcoding, such as bit rate conversion, may be performed on any one of the compressed bitstreams to be multiplexed. Bit rate alteration of one or more of the compressed bitstreams may be based on the bit rate capacity of the channel between the network device and the target decoder. In some embodiments, a compressed bitstream may be partially encoded or decoded to facilitate transcoding. The bit rate alteration may then occur on compressed video data, uncompressed video data, or at any partial compression status therebetween. By way of example, the bit rate alteration may include partial decoding, re-quantization, and VLC encoding to reduce redundancy and produce compressed video data with less information and a lower bit rate. Alternatively, the bit rate alteration may include full or partial decoding and downsampling that takes a high resolution video data and converts it to lower resolution video data. In another embodiment, the present invention relates to bit rate alteration methods that use a combination of bit rate alteration techniques. If there is sufficient bandwidth to send all the video channels, transcoding may be skipped.

The compressed video data is then scheduled to provide a bitstream comprising compressed video data (108). During scheduling and processing of multiple bitstreams by the network device, the look ahead window scans the combined buffers and provides information regarding the bitstream bit rate requirements to a multiplexer. The multiplexer then decides how to send out data from each of the buffers and allocates the output channel accordingly. This includes sending out a number of bits from each buffer as determined by the multiplexer. The number of bits from each buffer will typically be less than or equal to the variable size, X, of the look ahead window. When the amount of data transmitted from the buffer is less than the current size of the look ahead window, the look ahead window scans all the data in the window but only sends the portion designated by the multiplexer. In the next scanning and scheduling iteration, the look ahead window scans stored data starting with the data immediately following released data previously sent by the multiplexer and continues scanning according to the current size of the look ahead window.

Once scheduling is complete, the multiplexed bitstream may then be transmitted onto a transmission channel to the target decoder/receiver as desired (110). In one embodiment, the compressed video data is received, processed and transmitted in real-time.

The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference. The structure of an MPEG bitstream is well-known to one of skill in the art and not described in detail for sake of brevity.

The methods of this present invention may be implemented on various systems. For example, the invention may be implemented on network devices such routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Figure 5:
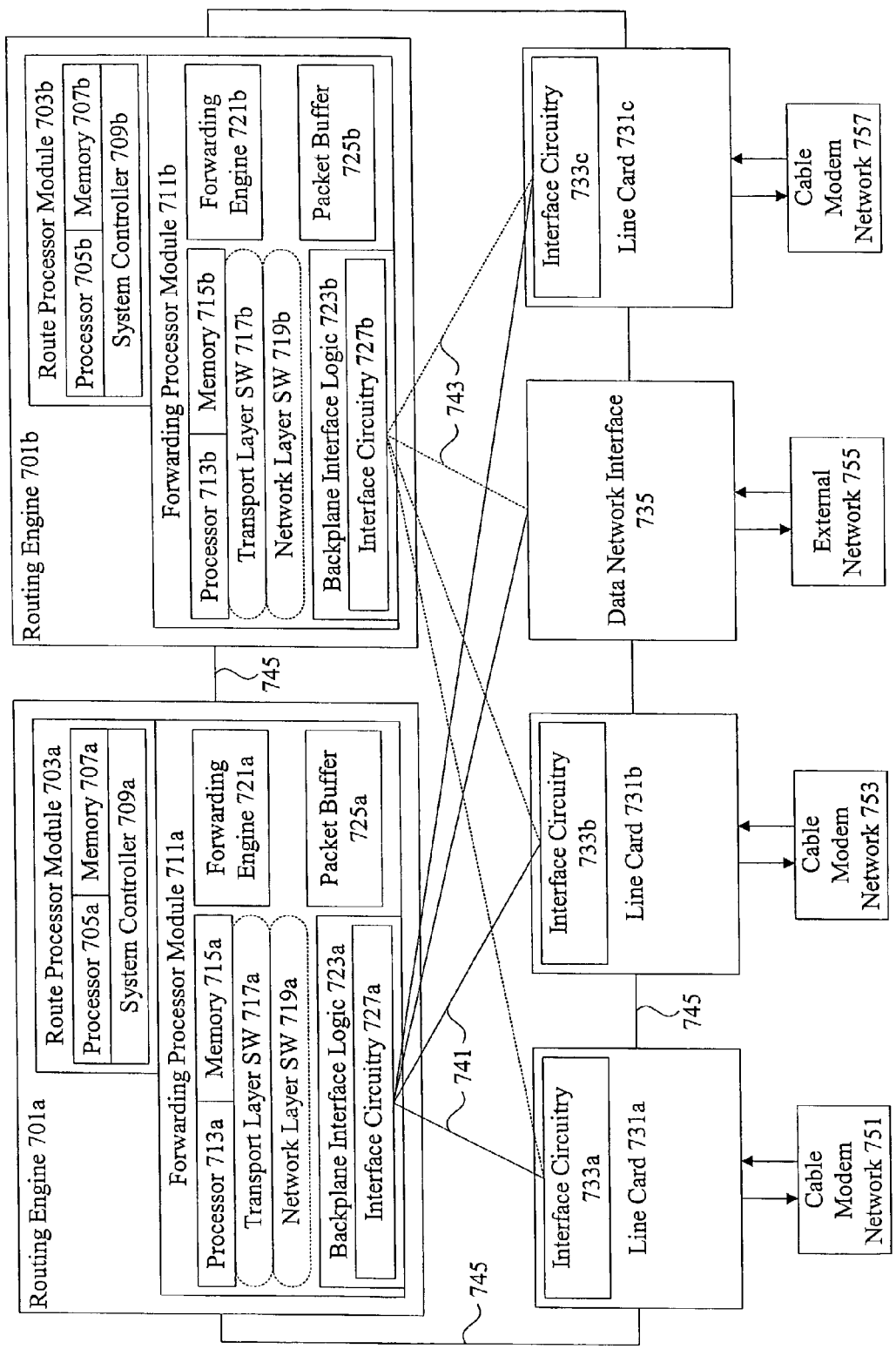
FIG. 5 is a block diagram of a router that may be used in conjunction with the techniques of the present invention.

FIG. 5 shows a block diagram of a specific embodiment of a Cable Modem Termination System (CMTS) 700 which may be used to implement certain aspects of the present invention. As shown in FIG. 5, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 4, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, combined buffers such as buffer 44, and data structures accessed by the components. It is specific embodiment, a combined buffer of the present invention such as buffer 44 is stored in dynamic random access memory (DRAM) or a burst random access memory (BRAM) or any other suitable RAM device. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 4, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to subscribers. One particular digital service delivers a compressed digital video signal for video streaming or video on demand.

Another particular communication channel that is becoming increasingly common is IP networks and Asynchronous Transfer Mode (ATM) networks. Both networks are based on different transport protocols which can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

In addition, although the present invention was primarily described in terms of improving multiplexer performance as implemented in a network device responsible for multiplexing multiple bitstreams, it is understood that techniques of the present invention are also useful for other applications where performance of a processing function is dependent on the amount of look ahead in a buffer. Alternatively, the present invention is not limited to buffers that service jitter introduced by a network transmission and may include jitter support for any process that introduces jitter.

While this invention has been described in terms of several preferred embodiments, there are alterations, permutations, and equivalents which fall within the scope of this invention which have been omitted for brevity's sake. For example, while methods of the present invention have primarily been described with respect to a multiplexer, techniques of the present invention for suitable for used by any scheduling mechanism disposed in a network device. It is therefore intended that the scope of the invention should be determined with reference to the appended claims.

What is claimed is:

1. A network device for transmitting compressed video data onto a channel, the network device comprising:
   an input network interface designed or configured to receive multiple bitstreams, at least one of the multiple bitstreams having packets that include jitter and transport compressed video data;
   a buffer designed or configured to store the packets received by the input network interface, wherein the buffer includes a first portion configured or designed to be used to remove the jitter from the packets, and a second portion, wherein the first and second portions are variably sized according to the amount of jitter in the packets;

a multiplexer designed or configured to schedule packets from the multiple bitstreams, scan packets in the second portion with a look ahead window, wherein the size of the look ahead window decreases with an increasing amount of jitter, and adjust allocation of bandwidth on the channel based on the buffer scan, an output network interface designed or configured to be in digital communication with the multiplexer and to output the packets from the bitstreams onto the channel.

2. The network device of claim 1 further comprising a bit rate converter designed or configured to transcode compressed video data.

3. The network device of claim 1 wherein the input network interface and the output network interface are included in a combined network interface.

4. The network device of claim 1 wherein the input network interface is designed or configured to receive compressed video data according to an IP protocol.

5. The network device of claim 1 wherein the buffer has a size that produces from a 50 millisecond to a 2500 millisecond delay between receiving the packets and processing of the packets by the multiplexer.

6. The network device of claim 5 wherein the buffer has a size that produces from a 350 millisecond to a 800 millisecond delay between receiving the packets and processing of the packets by the multiplexer.

7. The network device of claim 1 wherein the network device receives the multiple bitstreams from multiple channels.

8. The network device of claim 7 wherein the network device comprises a dedicated buffer for each of the multiple channels, wherein each buffer:

stores the packets received for a channel and removes jitter from the packets; and the multiplexer is further designed or configured to scan packets in each buffer to adjust allocation of bandwidth on the channel.

9. The network device of claim 1 wherein one of the multiple bitstreams includes a multiplexed data and the multiplexer implements a re-multiplex scheme.

10. The network device of claim 9 wherein the multiplexer is included in a statistical re-multiplexer.

11. The network device of claim 1 wherein the size of the second portion is not varied below a predetermined minimum size.

12. A method for transmitting compressed video data onto a channel, the method comprising:

receiving multiple bitstreams, at least one bitstream of the multiple bitstreams including compressed video data contained in packets that have jitter;

storing the packets in a buffer in a manner that reduces the jitter;

scanning the buffer using a look ahead window, wherein the size of the look ahead window decreases with an increasing amount of jitter;

scheduling the packets from the multiple bitstreams; and transmitting data packets from each of the multiple bitstreams onto the channel.

13. The method of claim 12 wherein one of the multiple bitstreams has previously been multiplexed.

14. The method of claim 12 wherein the packets are scheduled according to a statistical multiplexing scheme.

15. The method of claim 12 wherein the buffer has a size that produces from a 50 millisecond to a 2500 millisecond delay between receiving the data and scheduling.

16. The method of claim 15 wherein the at least one buffer has a size that produces from a 350 millisecond to a 800 millisecond delay between receiving the data and scheduling.

17. The method of claim 12 wherein scheduling the packets from the multiple bitstreams comprises adjusting allocation of bandwidth on the channel based on the buffer scan.

18. The method of claim 12 wherein the packets are received according to an IP protocol.

19. A network device for transmitting compressed video data onto a channel, the network device comprising:

means for receiving multiple bitstreams, at least one bitstream of the multiple bitstreams including compressed video data contained in packets that have jitter;

means for storing the packets in a buffer in a manner that reduces the jitter;

means for scanning the buffer using a look ahead window, wherein the size of the look ahead window decreases with an increasing amount of jitter;

means for scheduling the packets from the multiple bitstreams; and means for transmitting data packets from each of the multiple bitstreams onto the channel.

20. The network device of claim 19 further comprising means for adjusting allocation of bandwidth on the channel based on the buffer scan.

21. A computer readable medium including computer readable instructions for processing compressed video when executed by a processor, the instructions comprising:

instructions for receiving multiple bitstreams, at least one bitstream of the multiple bitstreams including compressed video data contained in packets that have jitter;

instructions for storing the packets in a buffer in a manner that reduces the jitter;

instructions for scanning the buffer using a look ahead window, wherein the size of the look ahead window decreases with an increasing amount of jitter;

instructions for scheduling the packets from the multiple bitstreams; and instructions for transmitting data packets from each of the multiple bitstreams onto the channel.

* * * * *